United States Patent
Ruggaber et al.

(10) Patent No.: US 7,287,066 B2
(45) Date of Patent: Oct. 23, 2007

(54) PUBLISH-SUBSCRIBE SYSTEM HAVING A RELIABILITY MECHANISM

(75) Inventors: Rainer Ruggaber, Paddington (AU); Elmar Dorner, Karlsruhe (DE); Alexander Schmid, Bad Urach (DE); Kim Elms, Carindale (AU)

(73) Assignee: SAP Aktiengesellschaft, Walldorf (DE)

( * ) Notice: Subject to any disclaimer, the term of this patent is extended or adjusted under 35 U.S.C. 154(b) by 719 days.

(21) Appl. No.: 10/698,978

(22) Filed: Oct. 31, 2003

(65) Prior Publication Data

US 2005/0096928 A1  May 5, 2005

(51) Int. Cl.
G06F 15/177 (2006.01)
G06F 15/16 (2006.01)

(52) U.S. Cl. ............ 709/220; 709/203; 709/206; 709/238; 714/1; 714/4

(58) Field of Classification Search ........ 709/202–203, 709/206, 220, 227–228, 245, 238–239; 714/1–4, 714/55, 100
See application file for complete search history.

(56) References Cited

U.S. PATENT DOCUMENTS

| | | | |
|---|---|---|---|
| 5,008,853 A | 4/1991 | Bly et al. | |
| 5,151,684 A | 9/1992 | Johnsen | |
| 5,299,287 A | 3/1994 | Tsuruta et al. | |
| 5,310,349 A | 5/1994 | Daniels et al. | |
| 5,395,243 A | 3/1995 | Lubin et al. | |
| 5,584,699 A | 12/1996 | Silver | |
| 5,619,555 A | 4/1997 | Fenton et al. | |
| 5,675,802 A | 10/1997 | Allen et al. | |
| 5,692,125 A | 11/1997 | Schloss et al. | |
| 5,727,950 A | 3/1998 | Cook et al. | |
| 5,727,951 A | 3/1998 | Ho et al. | |
| 5,739,512 A | 4/1998 | Tognazzini | |
| 5,788,508 A | 8/1998 | Lee et al. | |
| 5,802,514 A | 9/1998 | Huber | |
| 5,881,315 A | 3/1999 | Cohen | |

(Continued)

FOREIGN PATENT DOCUMENTS

EP  0 967 558 A  12/1999

(Continued)

OTHER PUBLICATIONS

Jörg Siekmann et al., "Adaptive Course Generation and Presentation," ITS Workshop on Adaptive and Intelligent Web-Based Foundation System, Montreal, The Omega Group; pp. 1-10, 2000.

(Continued)

Primary Examiner—Bharat Barot
(74) Attorney, Agent, or Firm—Fish & Richardson P.C.

(57) ABSTRACT

A publish-subscribe system includes a producer configured to publish a message and to subscribe to an acknowledgement that the message was received. The system also includes a consumer configured to subscribe to the message and to publish the acknowledgement. The system further includes a network configured to register a message subscription and an acknowledgement subscription, to process the message subscription and the acknowledgement subscription, to forward the message to the consumer based on the message subscription and to forward the acknowledgement to the producer based on the acknowledgement subscription.

18 Claims, 8 Drawing Sheets

U.S. PATENT DOCUMENTS

| | | |
|---|---|---|
| 5,918,211 A | 6/1999 | Sloane |
| 5,923,737 A | 7/1999 | Weishut et al. |
| 6,011,949 A | 1/2000 | Shimomukai |
| 6,014,134 A | 1/2000 | Bell et al. |
| 6,029,043 A | 2/2000 | Ho et al. |
| 6,091,930 A | 7/2000 | Mortimer et al. |
| 6,099,320 A | 8/2000 | Papadopoulos |
| 6,112,049 A | 8/2000 | Sonnenfeld |
| 6,134,552 A | 10/2000 | Fritz et al. |
| 6,148,338 A | 11/2000 | Lachelt et al. |
| 6,149,438 A | 11/2000 | Richard et al. |
| 6,149,441 A | 11/2000 | Pellegrino et al. |
| 6,154,781 A * | 11/2000 | Bolam et al. ............ 709/238 |
| 6,162,060 A | 12/2000 | Richard et al. |
| 6,164,974 A | 12/2000 | Carlile et al. |
| 6,175,841 B1 | 1/2001 | Loiacono |
| 6,179,206 B1 | 1/2001 | Matsumori |
| 6,182,143 B1 | 1/2001 | Hastings et al. |
| 6,185,542 B1 | 2/2001 | Moran et al. |
| 6,285,993 B1 | 9/2001 | Ferrell |
| 6,315,572 B1 | 11/2001 | Owens et al. |
| 6,327,576 B1 | 12/2001 | Ogasawara |
| 6,336,813 B1 | 1/2002 | Siefert |
| 6,341,960 B1 | 1/2002 | Frasson et al. |
| 6,347,333 B2 | 2/2002 | Eisendrath et al. |
| 6,347,943 B1 | 2/2002 | Fields et al. |
| 6,368,110 B1 | 4/2002 | Koenecke et al. |
| 6,370,355 B1 | 4/2002 | Ceretta et al. |
| 6,381,444 B1 | 4/2002 | Aggarwal et al. |
| 6,397,036 B1 | 5/2002 | Thean et al. |
| 6,398,556 B1 | 6/2002 | Ho et al. |
| 6,405,236 B1 * | 6/2002 | Nieratschker ............ 709/200 |
| 6,430,563 B1 | 8/2002 | Fritz et al. |
| 6,470,171 B1 | 10/2002 | Helmick et al. |
| 6,471,521 B1 | 10/2002 | Dornbush et al. |
| 6,491,217 B2 | 12/2002 | Catan |
| 6,514,085 B2 | 2/2003 | Slattery et al. |
| 6,527,556 B1 | 3/2003 | Koskinen |
| 6,587,668 B1 | 7/2003 | Miller et al. |
| 6,587,835 B1 | 7/2003 | Treyz et al. |
| 6,606,480 B1 | 8/2003 | L'Allier et al. |
| 6,622,003 B1 | 9/2003 | Denious et al. |
| 6,633,742 B1 | 10/2003 | Turner et al. |
| 6,643,493 B2 | 11/2003 | Kilgore |
| RE38,432 E | 2/2004 | Fai et al. |
| 6,685,478 B2 | 2/2004 | Ho et al. |
| 6,701,125 B1 | 3/2004 | Lohse |
| 6,709,330 B1 | 3/2004 | Klein et al. |
| 6,729,885 B2 | 5/2004 | Stuppy et al. |
| 6,801,751 B1 | 10/2004 | Wood et al. |
| 6,873,715 B2 | 3/2005 | Kuo et al. |
| 6,877,107 B2 * | 4/2005 | Giotta et al. ............ 714/4 |
| 6,988,138 B1 | 1/2006 | Alcorn et al. |
| 7,010,002 B2 * | 3/2006 | Chow et al. ............ 370/485 |
| 7,146,616 B2 * | 12/2006 | Dorner et al. ............ 719/318 |
| 7,149,807 B1 * | 12/2006 | Kontothanassis ............ 709/230 |
| 7,184,988 B1 * | 2/2007 | Frankel et al. ............ 709/203 |
| 2001/0018178 A1 | 8/2001 | Siefert |
| 2001/0044728 A1 | 11/2001 | Freeman et al. |
| 2001/0047310 A1 | 11/2001 | Russell |
| 2002/0006603 A1 | 1/2002 | Peterson et al. |
| 2002/0042041 A1 | 4/2002 | Owens et al. |
| 2002/0061506 A1 | 5/2002 | Catten et al. |
| 2002/0073063 A1 | 6/2002 | Faraj |
| 2002/0087496 A1 | 7/2002 | Stirpe et al. |
| 2002/0107681 A1 | 8/2002 | Goodkovsky |
| 2002/0138841 A1 | 9/2002 | Ward |
| 2002/0142278 A1 | 10/2002 | Whitehurst et al. |
| 2002/0188583 A1 | 12/2002 | Rukavina et al. |
| 2003/0013073 A1 | 1/2003 | Duncan et al. |
| 2003/0049593 A1 | 3/2003 | Parmer et al. |
| 2003/0073063 A1 | 4/2003 | Dattaray et al. |
| 2003/0073065 A1 | 4/2003 | Riggs |
| 2003/0082508 A1 | 5/2003 | Barney |
| 2003/0103075 A1 | 6/2003 | Rosselot |
| 2003/0113700 A1 | 6/2003 | Simon |
| 2003/0129576 A1 | 7/2003 | Wood et al. |
| 2003/0135556 A1 * | 7/2003 | Holdsworth ............ 709/206 |
| 2003/0151629 A1 | 8/2003 | Krebs et al. |
| 2003/0152899 A1 | 8/2003 | Krebs et al. |
| 2003/0152900 A1 | 8/2003 | Krebs et al. |
| 2003/0152901 A1 | 8/2003 | Altenhofen et al. |
| 2003/0152902 A1 | 8/2003 | Altenhofen et al. |
| 2003/0152903 A1 | 8/2003 | Theilmann |
| 2003/0152904 A1 | 8/2003 | Doty, Jr. |
| 2003/0152905 A1 | 8/2003 | Altenhofen et al. |
| 2003/0152906 A1 | 8/2003 | Krebs et al. |
| 2003/0157470 A1 | 8/2003 | Altenhofen et al. |
| 2003/0163784 A1 | 8/2003 | Daniel et al. |
| 2003/0175664 A1 | 9/2003 | Frangenheim et al. |
| 2003/0175676 A1 | 9/2003 | Theilmann et al. |
| 2003/0195946 A1 | 10/2003 | Yang |
| 2003/0211447 A1 | 11/2003 | Diesel et al. |
| 2003/0224339 A1 | 12/2003 | Jain et al. |
| 2004/0081951 A1 | 4/2004 | Vigue et al. |
| 2004/0210461 A1 | 10/2004 | Bohle |
| 2005/0014121 A1 | 1/2005 | Eck et al. |
| 2005/0066324 A1 | 3/2005 | Delgado et al. |
| 2006/0059253 A1 | 3/2006 | Goodman et al. |

FOREIGN PATENT DOCUMENTS

| | | |
|---|---|---|
| GB | 2313250 A | 11/1997 |
| GB | 2329301 A | 3/1999 |
| GB | 2373625 A | 9/2002 |
| WO | WO 99/09490 | 2/1999 |
| WO | WO 02 01467 A | 1/2002 |
| WO | WO 02/21379 | 3/2002 |
| WO | WO 02/073442 A | 9/2002 |
| WO | WO 02/091641 | 11/2002 |
| WO | WO 2004/023430 | 3/2004 |

OTHER PUBLICATIONS

Lai Jin et al., "An Ontology-Aware Authoring Tool—Functional structure and guidance generation," Proceedings of AIED '99, pp. 85-92, LeManns France, 1999.

Dietrich Albert et al., "Adaptive and Dynamic Hypertext Tutoring Systems Based on Knowledge Space Theory," AIED '97 Artifical Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Educational Systems", pp. 1-4, 1999.

Michael Jungmann et al., "Adaptive Hypertext in Complex Information Spaces," Daimler-Benz Research & Technology, Technical University of Ilmenau, pp. 1-5, Mar. 8, 1997.

Nicola Henze et al., "Modeling Constructivist Teaching Functionality and Structure in the KBS Hyperbook System," University of Hannover, pp. 1-12, Jun. 4, 1999.

Max Mühlhäuser, "Cooperative Computer-Aided Authoring and Learning," University of Karlsruhe, pp. 107-130, 145-161, 165-192, 273-291, 293-318, 1995.

Professor Jouko Paaso, "A New Environment for Courseware Development, Course Delivery and Training," Proceedings of the ED-Media 97, Toronto, 1997.

Banavar, G., et al., "An Efficient Multicast Protocol for Content-Based Publish-Subscribe Systems," Proceedings of the 19th International Conference on Distributed Computing Systems, ICDCS '99, Austin, TX, May 31—Jun. 4, 1999, International Conference on Distributed Computng Systems, Los Alamitos, CA: IEEE Computer Soc., US, May 31, 1999, pp. 262-272, XP000883611.

Segall, Bill and David Arnold, "Elvin Has Left the Building: A Publish/Subscribe Notification Service with Quenching," Distributed Systems Technology Centre, University of Queensland, Sep. 1997, XP002152244 AU, retrieved from the Internet: elvin.dstc.edu.au/document/papers/auug97/AUUG97.html.

THE451, "KnowNow Unveils 'N-Way' EAI over the Internet," TechTarget Network, XP002259981, retrieved from the Internet: original/Content/0,289142,sid26_gci75182.

Triantafillou, P., et al., "Subscription Summaries for Scalability and Efficiency in Publish/Subscribe Systems," Proceedings of the 22$^{nd}$ International Conference on Distributed Computing Systems Workshops (ICDCSW'02), Jul. 2, 2002, pp. 619-624, XP010601590.

Chappell, David A., "Asynchronous Web Services and the Enterprise Service Bus," [online], [retrieved from the Internet Feb. 10, 2004: /index.php/article/articlprint/352/-1/24/], May 6, 2002, XP002269724, 7 pgs.

Hapner, Mark, et al., "Java Message Service," [online], [retrieved from the Internet Mar. 13, 2001: products/jms/documents.html], Nov. 9, 1999, XP002162780, 111 pgs.

U.S. Appl. No. 60/201,500, filed May 3, 2000, Adams.
U.S. Appl. No. 60/272,251, filed Feb. 28, 2001, Ward.
U.S. Appl. No. 60/329,088, filed Oct. 12, 2001, Riggs.
U.S. Appl. No. 60/334,714, filed Nov. 1, 2001, Diesel.
U.S. Appl. No. 60/400,606, filed Aug. 1, 2002, Diesel.

Hewlett Packard, "HP OpenView Integration Guide for Developers," Jul. 2002, [online], [retrieved from the Internet on Mar. 24, 2004: /dspp/files/unprotected/OpenView/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: /PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: /software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: pub/a/onjava/2001/12/12/jms_not.html], 8 pgs., XP002274907.

Global Knowledge Network, Inc., "On Demand Personal Navigator," products/od/index.asp, Sep. 2002, 2 pgs.

x.hlp, "Software for faster learning," /home.cfm, Apr. 2003, 7 pgs.

Lipkin, Daniel, "Universal Learning Format Technical Specification," Jan. 13, 2001, retrieved from the Internet on Jul. 29, 2004, at /ulf.html, XP002290517, pp. 1-3.

Eugster, Patrick, et al., "Distributed Asynchronous Collections: Abstractions for Publish/Subscribe Interaction," Agilent Lab. and Lombard Odier Co., Jan. 10, 2000, pp. 1-34, XP002171795.

Shorshita, Teruji, et al., "A Large-scale Contents Distribution Architecture Based on Reliable Multicast," Proceedings Internet Workshop, 1999, IWS '99 Osaka, Japan, Feb. 18-20, 1999, pp. 75-80, XP010365597.

Fitzpatrick, Geraldine, et al., 'Augmenting the Workaday World with Elvin' [online]. *Proceedings of ECSCW'99*, Sep. 1999, Kluwer Academy Publishers, Copenhagen, Denmark, pp. 431-451 [retrieved on Jan. 26, 2005]. Retrieved from the Internet: <URL: Research/Projects/EWP/Papers/ecscw99-dist.pdf>.

Gorton, Ian, et al., 'An Efficient, Scalable Content-Based Messaging System,' *Proceedings of the Seventh IEEE International Enterprise Distributed Object Computing Conference* (EDOC '03), Sep. 16, 2003, pp. 278-285.

Padovitz, Amir, et al., 'Awareness and Agility for Autonomic Distributed Systems: Platform-Independent Publish-Subscribe Event-Based Communication for Mobile Agents,' *Proceedings of the 14$^{th}$ International Workshop on Database and Expert Systems Applications* (DEXA '03), Sep. 1, 2003, pp. 669-673.

Chang et al., "Web Browsing in a Wireless Environment: Disconnected and Asynchronous Operation in ARTour Web Express", IBM Research Center, ACM Press 1997, pp. 260-269.

* cited by examiner

REQUEST MESSAGE 410

| | | |
|---|---|---|
| 412 | R-CONSUMER | '|CONSUMERX|CONSUMERY|' |
| 414 | R-PRODUCER | 'PRODUCERX' |
| 416 | R-MID | 1 |
| 418 | R-TYPE | 'REQ' |

FIG. 4A

ACKNOWLEDGEMENT MESSAGE 430

| | | |
|---|---|---|
| 412 | R-CONSUMER | '|CONSUMERX|' |
| 414 | R-PRODUCER | 'PRODUCERX' |
| 416 | R-MID | 1 |
| 418 | R-TYPE | 'ACK' |

FIG. 4B

PUBLISH-SUBSCRIBE SYSTEM HAVING A RELIABILITY MECHANISM

TECHNICAL FIELD

The following description relates to network communications, and in particular to publish-subscribe systems.

BACKGROUND

A publish-subscribe system contains information producers and information consumers. Information producers publish events to the system. Information consumers subscribe to particular categories of events within the system. The publish-subscribe system provides delivery of published events to those information consumers that subscribes to the event. In the publish-subscribe system, a producer of the message does not know where the message will be received and a consumer of the message does not know from where the message was sent.

One type of publish-subscribe system is subject-based. In the subject-based publish-subscribe system, each message belongs to one of a fixed set of subjects. Producers label each message with a subject and consumers subscribe to messages having a particular subject.

Another publish-subscribe system is a content-based messaging (CBM) system. CBM systems support a number of information spaces, where subscribers may express a "query" against the content of published messages.

Publish-subscribe systems are unreliable because it is not known whether a message was actually received by a consumer or not. If the message is resent because some subscribers have not received the message, the remaining subscribers will receive a duplicate message.

SUMMARY

In one aspect, the invention is a publish-subscribe system. A publish-subscribe system includes a producer configured to publish a message and to subscribe to an acknowledgement that the message was received. The system also includes a consumer configured to subscribe to the message and to publish the acknowledgement. The system further includes a network configured to register a message subscription and an acknowledgement subscription, to process the message subscription and the acknowledgement subscription, to forward the message to the consumer based on the message subscription and to forward the acknowledgement to the producer based on the acknowledgement subscription.

This aspect may include one or more of the following features. The producer may include a reliability mechanism to subscribe to the acknowledgement associated with a published message. The producer may include a timer and the producer may republish the message if a period of time expires before receiving the acknowledgement. The consumer may include a reliability mechanism to publish an acknowledgement for the message. The reliability mechanism may remove duplicate messages. The network may include a content-based messaging (CBM) router to route the message and the acknowledgement. The system may use a generic addressing scheme in acknowledging a message. The generic addressing scheme may provides a unique identity to the consumer and the producer.

In another aspect, the invention is a reliability application program interface (API) for reliable content-based messaging. The API includes instructions to cause a processor to receive a message from a producer application, to register a subscription for an acknowledgement to the message, to modify the message by adding fields to the message and to forward the message to an interface to publish the message to a content-based message (CBM) network. The instructions also cause a processor to receive the acknowledgement from the interface.

This aspect includes one or more of the following features. The API may include instructions to cause a processor to implement a timer and republish the message if a period of time expires before receiving the acknowledgement. The fields may include an identification field and a message type field. The fields may include a recipient field that identifies one or more receivers of the message. The fields may include a sender field that identifies a sender of the message.

In another implementation, a reliability application program interface (API) for reliable content-based messaging is described. The API includes instructions to cause a processor to receive a message from an interface, to modify the message by removing fields from the message, to publish an acknowledgement to the message, and to forward the message to a consumer application.

This aspect may include one or more of the following features. The API may include instructions to cause a processor to determine if the message has been previously received and to filter out the message if the message has previously been sent. The fields may include an identification field and a message type field. The fields may include a recipient field that identifies one or more receivers of the message. The fields may include a sender field that identifies a sender of the message.

One or more of the aspects above have one or more of the following advantages. The system has the advantage of being a reliable publish-subscribe system that ensures that messages are received. If the messages are not received, the system has the capability of resending the message only to those receivers that have not received the message. The system can be used with other systems that do not have a reliability mechanism.

DESCRIPTION OF DRAWINGS

FIG. 4A is an example of a request message.

FIG. 4B is an example of an acknowledgement message.

Like reference symbols in the various drawings indicate like elements.

DETAILED DESCRIPTION

Various conditions in a content-based messaging system (CBM) network may lead to message loss or interruption in communications. For example, the CBM network may lose messages or be unable to send messages if the messages are not processed in a timely manner by a message receiver. Likewise, messages also may be lost due to network failure or other network conditions. In addition, messages in a typical CBM network are not addressed and sent to a specified receiver thereby a message receiver does not know the source of the received messages. As a result, applications in a typical CBM network are not able to determine whether a message was successfully delivered or received.

Many applications require reliable end-to-end communications to operate continuously and properly. For example, a message sender requires reliability in sending messages to message receivers, and message receivers require reliability in receiving sent messages. Reliable CBM, as described in detail below, provides reliable end-to-end communications while preserving the publish-subscribe paradigm and many of the benefits associated with a CBM system.

System Overview

Figure 1:
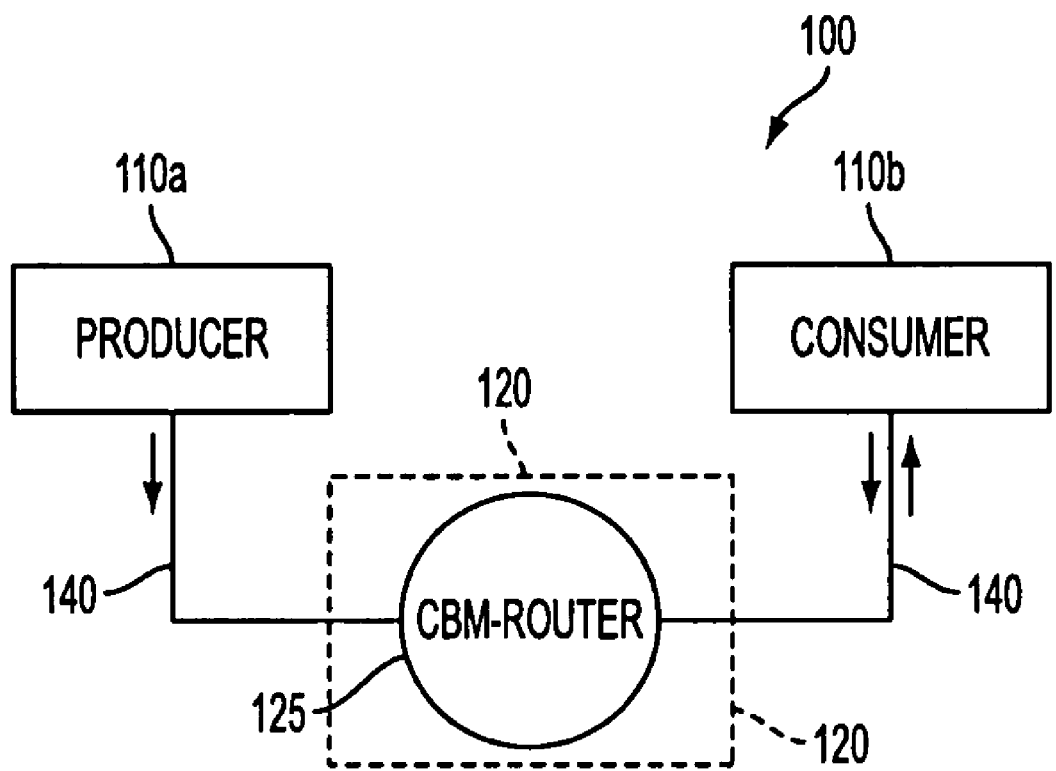
FIG. 1 is a block diagram of an exemplary communication system.

Referring to FIG. 1, a communications system 100 may include two or more client devices 110 (e.g., a client device 110a and a client device 110b) and a CBM network 120, which includes at least one CBM router 125. The client devices 110a and 110b exchange data with the CBM network 120 using communications paths 140.

The client devices 110a and 110b may be operated by one or more users to access and exchange information with the CBM network 120. An example of client device 110a and 110b is a general-purpose computer capable of responding to and executing instructions in a defined manner.

FIG. 1 shows one client device 110a as a producer and one client device 110b as a consumer; however, either client device 110a or 110b may function as an information producer, an information consumer, or both.

Any message that is published to the CBM network 120 is evaluated by the CBM router 125 against any current registered subscriptions. If an incoming message conforms to a given subscription, the message is forwarded to the associated consumer 110b by the CBM network 120.

Producer 110a and consumer 110b are anonymous with respect to each other. For example, a message may be routed as follows. Consumer 110b submits a subscription expressing what type of message content or information is desired. Consumer 110b may submit subscriptions to CBM network 120 at any time. Producer 110a publishes messages to CBM network 120 without providing any address or destination for the information. CBM-Router 125 compares any published message with registered consumer subscriptions to determine the consumers that should receive the published message. For the routing process, all elements of the published message are taken into consideration when comparing the published message with consumer subscriptions. The elements are, for example, name-value pairs and each message includes multiple name-value pairs. CBM-router 125 then forwards the message to any consumer 110b that the CBM router 125 determines is subscribed to the information in the message.

A reliability component, for example, a reliability layer (R-Layer), which includes an associated protocol, executed by the R-layer, is installed on each client device to provide reliable end-to-end communication within communications system 100.

The R-layer ensures reliability by providing an acknowledgement mechanism. The acknowledgement mechanism generates an acknowledgement for published messages when reliable communications are selected by a user or by an application. If an acknowledgement does not arrive within a timeout period, the message is resent.

The reliability mechanism is an extension to CBM. The R-layer enables either producer 110a or consumer 110b to request and provide reliable message delivery at any time. Whenever reliable communications are desired, the producer or consumer applications may activate the reliability mechanism to ensure reliable communication (e.g., through configuration, automatically, or through a user interface). However, the decoupling of the producer and consumer is maintained, because the producer does not know the consumers of a message.

Reliability Mechanism

To increase reliability, the R-layer provides a solution to various problems associated with CBM systems, for example, message loss and missed timeouts. Message loss occurs when a message is not delivered to a receiver/consumer because of various reasons, such a network communications problems.

Message loss is solved by an acknowledgement mechanism. When reliable communications are desired, a timer may be associated with a published message. A message timeout (e.g., expiration of the timer) forces a producer 110a to resend a message. Therefore, if message delivery is not made within a given time, the producing application receives an error message and the message is resent. The delivery of a message is considered reliable, if the producing application does not receive an error within a given time after the message is handed over to the R-layer using the send-method. As a result, the status of a message delivery is determined passively by monitoring for an error indication.

However, if messages are resent, consumer 110b can receive the same message more than one time. For example, if a message times out too early, both the resent and the original message may be received by a consumer. Therefore, duplicate messages are identified by a message identification feature and are filtered out.

Architecture

The reliability protocol is provided by the client devices 110. As a result, no changes to CBM network 120 are required to implement a reliable CBM system.

Figure 2:
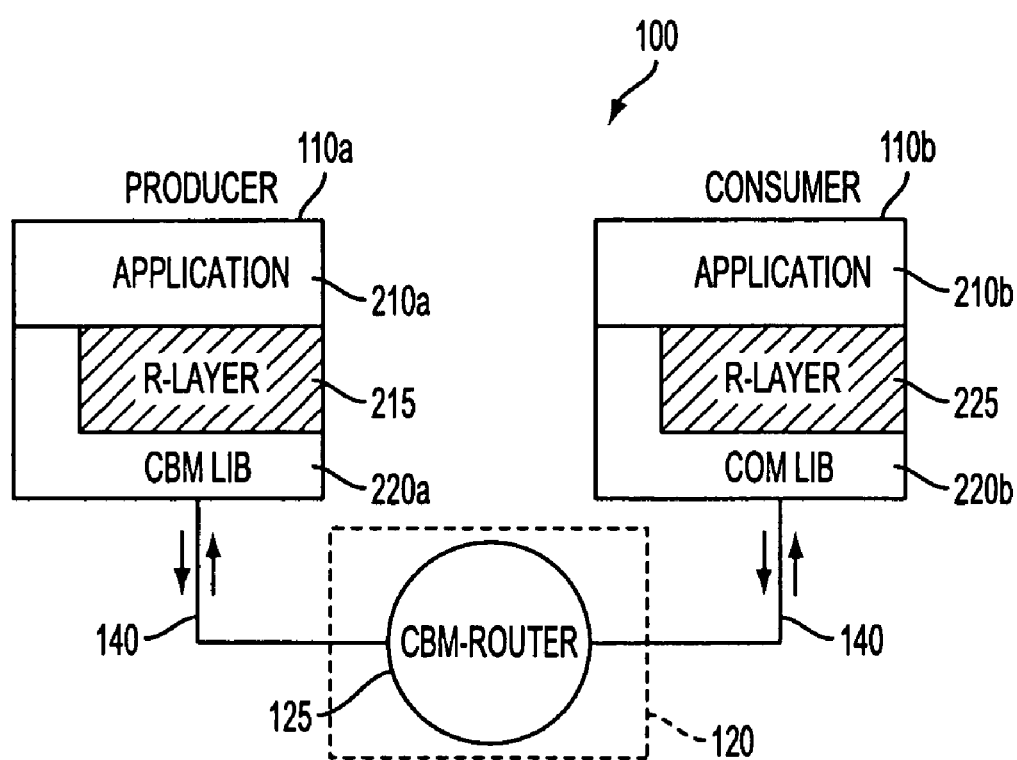
FIG. 2 is a block diagram of another exemplary communication system.
Figure 3:
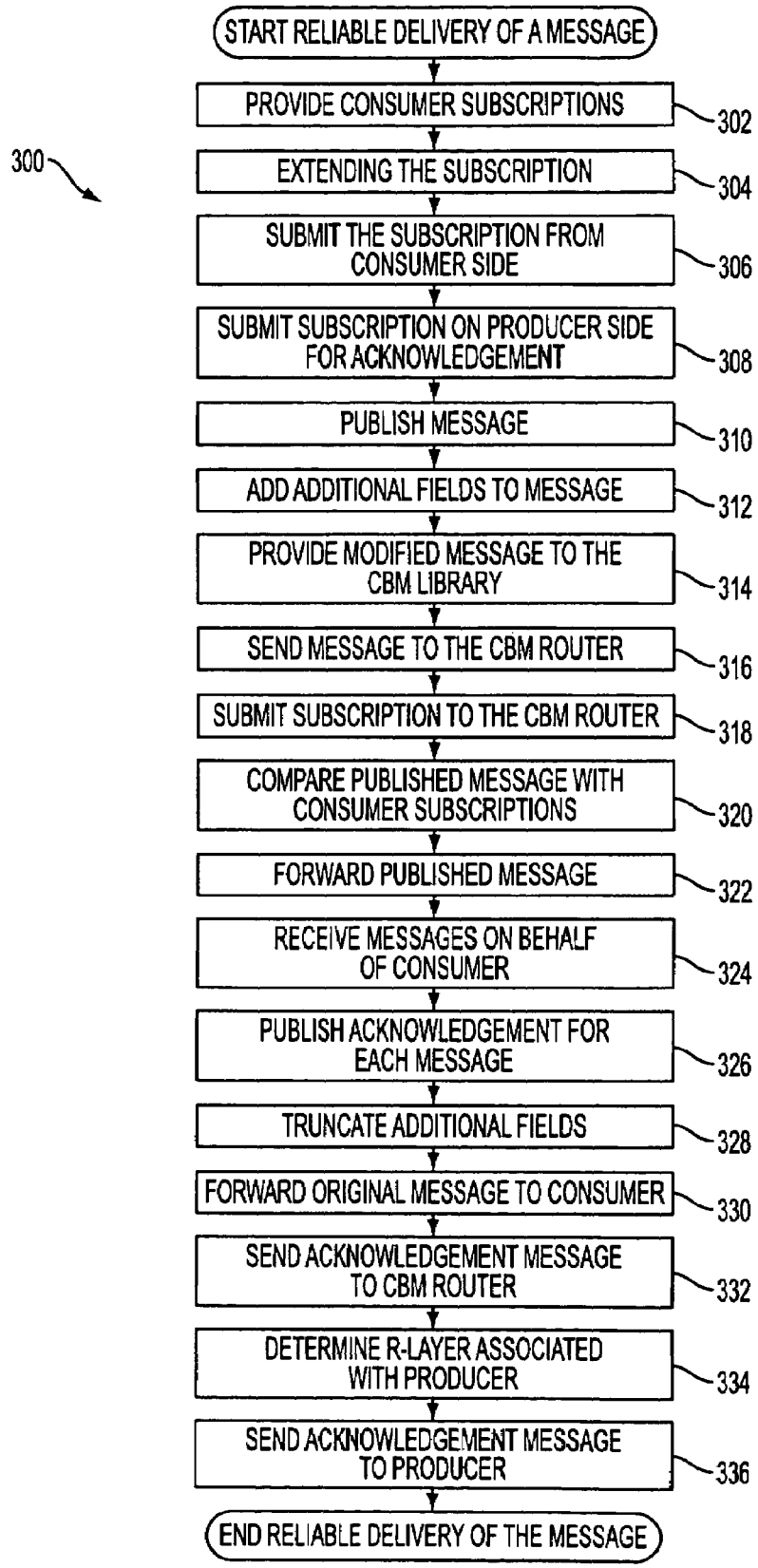
FIG. 3 is a process for delivering a message.

FIGS. 2 and 3 illustrate reliable delivery of a message. Producer 110a includes a producer application 210a, a R-Layer 215 and a CBM library 220a. Consumer 110b includes a consumer application 210b, a R-layer 225 and CBM library 220b. CBM library 220a interfaces with CBM network 120. For example, using CBM library 220a, producer 110a may publish information to CBM network 120.

In order to provide reliable messaging for application 210b, R-Layer 215 and R-layer 225 each provides an interface between the application and CBM client library 220b. Each R-Layer 215 and 225 uses its respective CBM client library 220a and 220b for communication with CBM network 120.

Applications 210a and 210b are stored in their respective CBM library 220a and 220b. As a result, each application 210a and 220b can communicate reliably (using the R-Layer interface in conjunction with the CBM library). Applications 210a and 210b may also interface directly and unreliably with CBM library 220a and 220b respectively by bypassing R-Layers 215 and 225.

R-Layers 215 and 225 each use their respective CBM client library 220a and 220b as an unreliable messaging service. In the following description, the functionality of the CBM client library 220 is bypassed so that each R-Layer 215 and 225 is communicating directly with CBM-Router 125.

Referring to FIG. 3, process 300 is an exemplary process for delivering a reliable message using communications system 100.

Process 300 provides subscriptions to CBM network 120 from consumer 110b (302). The subscription expresses what type of message content is of interest to the consumer application 210b. When reliable communication is desired, process 300 extends (304) the subscription. For example, the subscription is extended by R-layer 225 without restricting the original subscription. Process 300 submits (306) the subscription by using R-Layer 225 on behalf of consumer application 210b to CBM network 120 using CBM library 220b.

Process 300 submits a subscription for acknowledgments to the CBM network 120 by using R-Layer 215 through its CBM library 220a (308). The producer R-layer 215 subscribes to acknowledgements to messages published by the producer application 210a.

When producer 110a publishes a message for which reliability is desired, process 300 provides the message to R-Layer 215 (310). Process 300 adds one or more fields by using the reliability mechanism of the R-layer 215 as required by the R-layer to modify the message (312). The fields are used by an addressing scheme of the acknowledgement mechanism and a message identification that allows specific messages to be identified in the communications network 100. The modified message conforms to CBM standards (i.e., every field within the message can be examined for routing of the message).

Process 300 provides the modified message to the CBM library 220a using R-layer 215 (314). Process 300 sends the message from CBM library 220a to the CBM-router 125 through communications path 140 (316). Process 300 submits a subscription from the producer R-layer 215 to the CBM router 125 to register for acknowledgement messages in response to the published messages for which reliability is desired (318).

Process 300 compares the published message with all consumer subscriptions to determine the consumers of the message (320). For example, the comparison is performed in the CBM-router 125. Process 300 forwards the published message to client devices 110 according to the subscriptions determined by CBM-router 125 (322).

Process 300 receives messages at the consumer R-layer via CBM library 220b to which the consumer application 210b has subscribed (324). Process 300 publishes an acknowledgement message for each received message from the consumer R-layer 225 (326). Process 300 truncates the added reliability fields using the consumer R-layer 225 (328). Process 300 forwards the original message (i.e., the unmodified message) to the consumer application (330).

Process 300 sends the published acknowledgement message to the CBM router 125 (332). Process 300 determines the R-layer (associated with a producer) that subscribes to the acknowledgement message (334). For example, the determination is made by the CBM router 125. Process 300 sends the acknowledgement message from CBM router 125 to the corresponding producer R-Layer 215 (i.e., the associated producer application) to ensure the reliable delivery of the message (336).

The producer R-layer 215 implements an acknowledgement receipt timer. If the acknowledgement messages is not received, a timeout period expires and the R-layer 215 may resend the message to ensure reliable delivery of the message.

Protocol Fields and Subscriptions

In order to execute the protocol used by the R-layer, the messages are supplemented with additional information and subscriptions are added to ensure the required messages are received. New name-value pairs are required to be able to describe required messages using subscriptions. In the following description, the added name-value pairs will be provided before the subscriptions are presented.

Referring to FIGS. 4A and 4B, a request message 410 and an acknowledgement message 430 each includes a R-Consumer field 412, a R-Producer field 414, a R-MID field 416 and a R-type field 418.

The R-Consumer field 412 identifies those one or more receivers from whom the sender of the message expects an acknowledgement. Multiple receiver names are separated by a "|"-symbol. This enables the unique identification of receivers in the string. The "|"-symbol is reserved and cannot be The R-Producer field 414 contains the identification of the sender of the reliable message. No separation symbol is needed, as there can be only one sender for a message.

The R-MID field 416 is a message identification field. The R-MID field 416 contains a sequence number that uniquely identifies a message sent by a specific sender. The receiver of a reliably sent message stores the R-MID—sender pairs for all messages it has received. If a message is received with an R-MID—sender pair that is already in the list, then the message is considered a duplicate and discarded.

The R-Type field 416 identifies a message to be a request or an acknowledgement. A value of "ACK" indicates a request message and a value of "REQ" indicates a request message.

The specified name-value pairs are needed by each R-Layer 215 and 225 for the sender and the receiver of the messages to be able to specify the required messages.

The Producer 110a uses the subscription:
"(R-Producer='ProducerX') && R-Type='ACK'"

to receive all acknowledgements from messages sent by the producer 110a. The Producer 110a requires that the R-Producer field 414 contains its identification and that the type of the message, contained in the R-Type field 418 is set to "ACK".

The Consumer 110b uses the subscription:
"(Application Subscription) && contains(R-Consumer, '|ConsumerX|') && R-Type='REQ'")

to specify all messages it wants to receive. The receiver of a reliably sent message requires messages to fulfill the original subscription of the receiving application, to have the message type (R-Type) 418 be "REQ", and to have the R-Consumer field 412 contain the identification of the receiver.

Generic Addressing Scheme

The generic addressing scheme is an extension of the traditional use of addresses identifying communication endpoints. Addressing identifies components that provide acknowledgement messages (ACKs). In the R-Layers 215 and 225, it is a mutual agreement that creates a context between loosely coupled senders and receivers. The R-Layers 215 and 225 do not define the structure of the addresses. Addresses can be provided by applications using addressing schemes that are already in existence.

To ensure reliability the producer R-Layer 215 determines each consumer R-Layer 225 from which an acknowledgement is expected. Likewise, the consumer R-Layer 225 has to determine for which messages an acknowledgement is to be sent. To provide for these determinations a generic addressing scheme is introduced to identify communication endpoints. The addressing scheme provides each client or application with a unique identity. The addressing scheme is generic; therefore, no mapping of existing address formats is required and existing addressing schemes can be used directly.

In addition, the addressing scheme is implemented in the R-Layers 215 and 225 to realize the acknowledgement mechanism, and is independent of the producer and consumer applications 210a and 210b. The producer and consumer applications 210a and 210b do not require any interface or special instructions when implementing the addressing scheme in the R-layers 215 and 225.

The generic addressing scheme is a string that can contain the address chosen by the application, for example, a number, an alphanumeric number, an Internet address and so forth.

Application Program Interface

Each R-Layer 215 and 225 has an application program interface (API), which is similar to the API that is provided by the underlying CBM library layer 220a and 220b thereby allowing transparent integration of their respective R-layer 215 and 225 into the communications system 100. As a result, integrations of existing applications are possible with minimal effort. The flexibility of the R-Layers 215 and 225 addressing scheme allows the use of existing application addresses that are used in order to identify the R-Layers instances.

Figure 5:
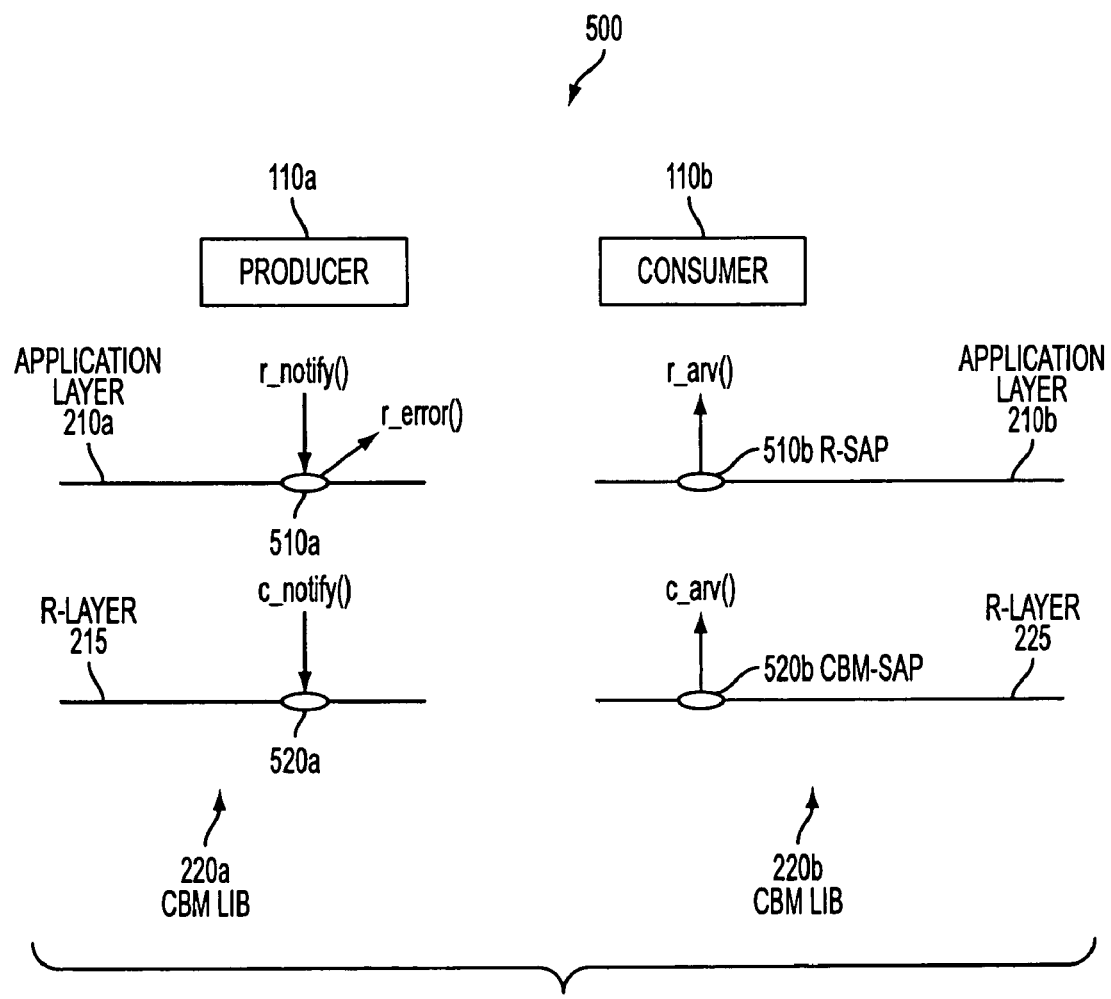
FIG. 5 is a diagram of application layer interfaces.

Referring to FIG. 5, producer 110a includes a R-layer Service Access Point (R-SAP) 510a and a CBM-SAP 520a and consumer 110b includes a R-SAP 510b and a CBM-SAP 520b.

The R-SAPs 510a and 510b are positioned between their respective Application layer 210a and 210b and their respective R-layer 215 and 225. At the producer application 210a, a command r_notify( ) publishes a message and specifies receiving R-Consumers and the command r_error( ) provides an error indication if the message cannot be sent within a given time. At the consumer application 210b, the command r_arrive( ) provides a message arrival event to the consumer application.

The CBM-SAPs 520a and 520b provide an interface between the R-layer 215 and 225 and the CBM layer. At the producer 110a, the command c_notify( ) publishes the message to the CBM network 120. At the consumer 110b, the command c_arv( ) provides for a message arrival event.

Figure 6:
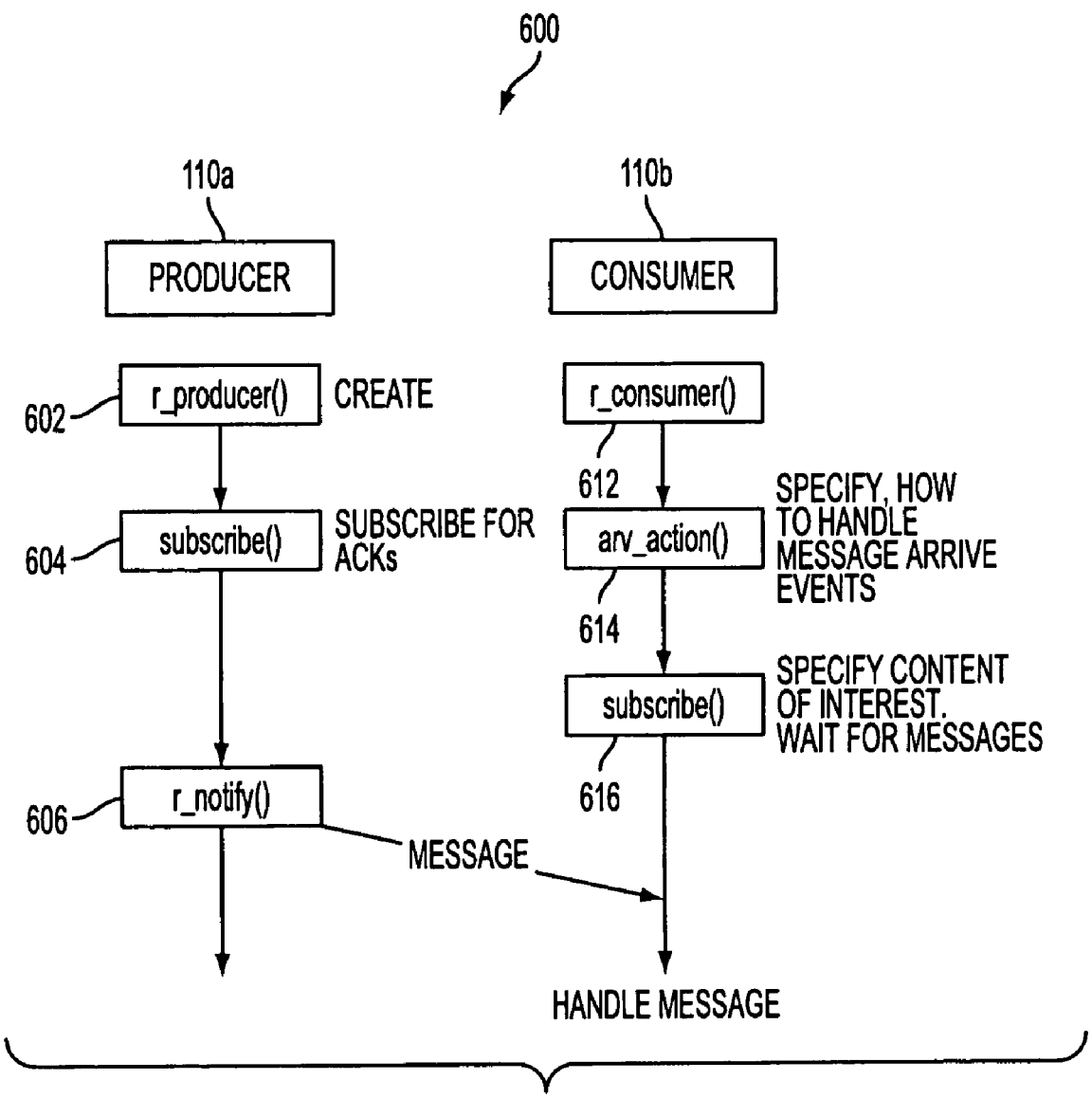
FIG. 6 is an exemplary calling sequence.

Referring to FIG. 6, a process 600 are the commands executed at the producer 110a and the consumer 110b to provide reliable messaging.

At the producer 110a, command r_producer( ) 602 creates the R-Producer field 414 and monitors for R-Layer error events. A subscribe( ) command 604 provides a subscription to CBM network 120 for acknowledgements. A r_notify( ) 606 sends the message and specifies the R-Layer consumers 110b expecting an acknowledgement.

At the consumer 110b, a command r_consumer( ) 612 creates the R-Consumer field 412. The command arv_action( ) 614 then specifies a receiver for arriving messages to handle the data in the consumer application 210b. A subscribe( ) command 616 provides a subscription to specific message content that is of interest to the consumer application 210b. The consumer application 210b then waits for published messages.

Multicast Messages

In the multicast case, reliable communication with more than one consumer is possible. One message is published and all specified consumers send an acknowledgement. If all acknowledgements do not arrive within a given time, the message is resent. To minimize overhead associated with resending messages, only consumers with outstanding acknowledgements are taken into account. The unicast case can be seen as a specialization of the multicast case, because only one consumer is sending an acknowledgement.

The timeout mechanism is dynamic and adapts to varying network conditions. For the timeout calculation, recent message roundtrip times may be taken into consideration. Therefore, the actual timeout variable is the moving average of recently successful delivered messages. If a timeout is missed, then the timeout calculation increases by a multiplicative fault term.

Each R-Layer 215 and 225 is continuously measuring the roundtrip time t. This is the time required to send a message to a remote site and return it again. The timeout for a reliable message is 2*t. If the sender does not receive an acknowledgement after this timeout, the message is resent and the timeout is set to 4*t. The timeout is doubled every time it is missed until a specifiable upper limit. The upper limit ensures that there is a point in time when the sender can assume that the message was received.

Scalability with a growing number of clients is achieved by keeping the CBM infrastructure simple. As previously described, the protocol logic is located at the client side, which provides adequate processing power to scale for a growing number of clients.

Flow control is realized by a send window mechanism, where only a specific amount of unacknowledged messages is allowed. Congestion is avoided through status messages from the CBM-Infrastructure. If the producer or consumer receives a dropped message warning, indicating that the CBM infrastructure is overloaded, the producer can reduce the send rate (thereby minimizing the chance of congestion).

Heterogeneous environments

Support for heterogeneous environments is available, and applications with or without reliability requirements may be supported. Moreover, applications without reliability requirements can receive messages from producers with reliability requirements; however, the message delivery is not reliable (i.e., there is no way for the producer to verify the message has been delivered). Each R-layer 215 and 225 extends messages by the fields added to the message, however, the modified messages conform to CBM standards and can be routed by regarding all message elements. In heterogeneous environments, messages that are resent could harm consumers that are not implementing the R-Layer. In fact, the consumers would receive the same massage multiple times. As a result, this would be a breach of the once delivery requirement provided by most CBM infrastructures. To prohibit multiple deliveries of the same message, messages are sent in a resend tunnel encapsulating the original messages.

In one implementation, the CBM infrastructure used for the implementation is Elvin. Elvin is a flexible and simple to use messaging architecture developed by the DSTC in Brisbane (Australia). The protocol works asynchronously (i.e., the producer loses the message context immediately after calling the send method); in particular the send method does not wait until the acknowledgement arrives.

The reliable multicast message delivery is only as fast as the slowest consumer. The consumer with the largest response time dictates the system performance.

Figure 7:
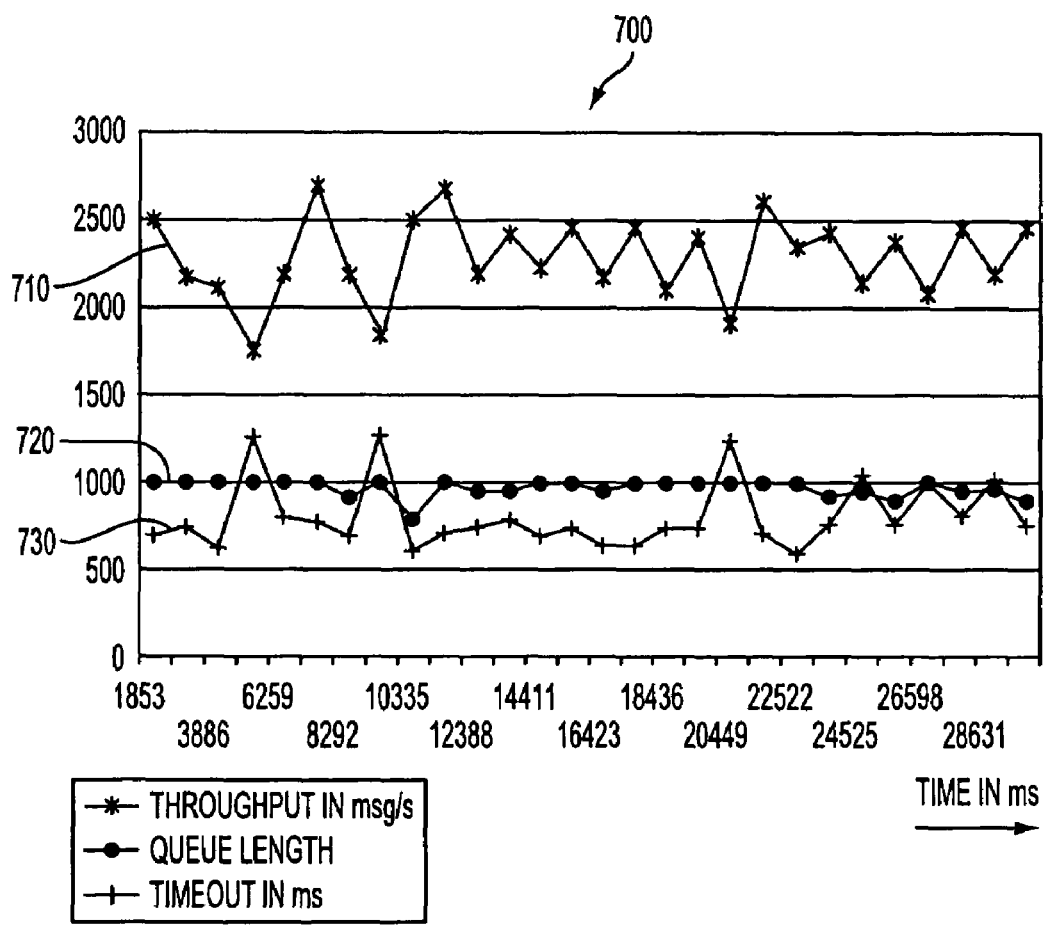
FIG. 7 is graph for throughput of unicast messages using a reliable content-based messaging system.

FIG. 7 shows that the reliability CBM protocol may adapt to changing conditions. Small unicast messages are sent over a system 100 consisting of standard hardware, e.g., producer 110a, consumer 110b and CBM router 125 run on Pentium II machines (550-933 MHz) connected by a 100 MBit/s Ethernet. In this example, a throughput of 2300 messages per second is achieved. The example shows that the timeout adapts to varying conditions, and that the maximum queue length for unacknowledged messages was 1000.

When message throughput decreases and the number of timeouts increase, system 100 adapts to reduce message timeout until throughput increases while maintaining queue length (e.g., between 3886 and 6259 ms). In the multicast case, the scalability for up to 1000 consumers was confirmed. With an increasing number of consumers, the total throughput of messages, consisting of request messages and acknowledgements was constant.

Consumer subscriptions are preserved. The reliability mechanism extends the subscriptions, without any harm to the original subscriptions. Consumers can express their demands with the full functionality of the subscription language.

The communications system 100 maintains loosely coupled consumer and producer relationship and the unrestricted use of client subscriptions is ensured. The communications system 100 also provides a connectionless communication with at least one delivery semantic. The communications system 100 also supports multicast communication, and runs in heterogeneous environments, in which either client requires reliable and unreliable communication. The CBM system provides support for transparent integration of existing applications. The CBM network 120 also provides an API that is similar to existing CBM APIs requiring little if any additional programming overhead to allow integration in existing systems.

The CBM system 100 also adapts to varying network conditions and client capabilities. In addition, the CBM system may be scaled to the number of consumers and message size.

Problems due to message loss are transparent to the client devices 110 and applications 210. Consumer application 210b receives messages reliably through a subscription for message content, exactly in the same way as the unreliable message. The reliability mechanism masks all faults and provides a reliable messaging service for the applications of the client devices 110.

Figure 8:
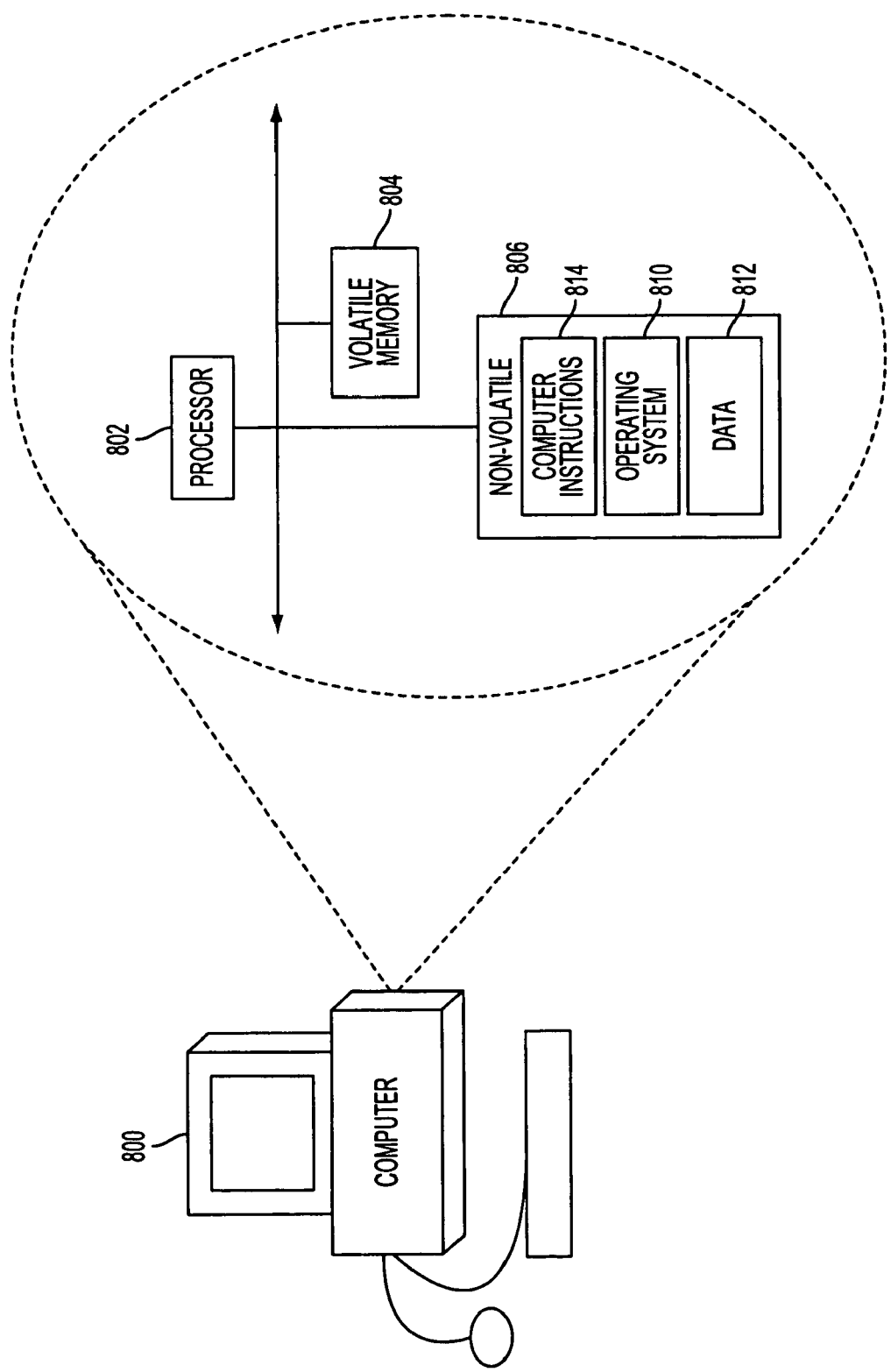
FIG. 8 is a block diagram of a computer system on which the process of FIG. 3 may be implemented.

FIG. 8 shows a computer 800 for using process 300. Computer 800 includes a processor 802, a volatile memory 804, and a non-volatile memory 806 (e.g., hard disk). Non-volatile memory 806 stores operating system 810, data storage 812, and computer instructions 814 which are executed by processor 802 out of volatile memory 804 to perform process 300.

Process 300 is not limited to use with the hardware and software of FIG. 8; it may find applicability in any computing or processing environment and with any type of machine that is capable of running a computer program. Process 300 may be implemented in hardware, software, or a combination of the two. For example, process 300 may be implemented in a circuit that includes one or a combination of a processor, a memory, programmable logic and logic gates. Process 300 may be implemented in computer programs executed on programmable computers/machines that each includes a processor, a storage medium or other article of manufacture that is readable by the processor including volatile and non-volatile memory and/or storage elements), at least one input device, and one or more output devices. Program code may be applied to data entered using an input device to perform process 300 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium or device e.g., CD-ROM, hard disk, or magnetic diskette that is readable by a general or special purpose programmable computer for configuring and operating the computer when the storage medium or device is read by the computer to perform process 300. Process 300 may also be implemented as one or more machine-readable storage media, configured with a computer program(s), where upon execution, instructions in the computer program(s cause a computer to operate in accordance with process 300.

Process 300 is not limited to the specific implementations described herein. For example, process 300 is not limited to the specific processing order of FIG. 3. Rather, the blocks of FIG. 3 may be re-ordered, as necessary, to achieve the results set forth above.

In some implementations, client devices 110 also may include a special-purpose computer, a personal computer ("PC"), a workstation, a server, a laptop, a Web-enabled phone, a Web-enabled personal digital assistant ("PDA"), an interactive television set, a set top box, an on-board (i.e., vehicle-mounted) computer, or a combination of two or more these devices capable of responding to, generating, and/or executing instructions. The client device 110 may include any number of other devices, components, and/or peripherals, such as memory/storage devices, input devices, output devices, user interfaces, and/or communications interfaces.

The client device 110 also may include one or more software applications (e.g., an operating system, a browser application, a microbrowser application, a server application, a proxy application, a gateway application, a tunneling application, and a CBM communications application) loaded on the client device 110 to command and direct the client device 110. Applications may include a computer program, a piece of code, an instruction, or some combination thereof, for independently or collectively instructing the client device 110 to interact and operate as desired.

The applications may be embodied permanently or temporarily in any type of machine, component, physical or virtual equipment, storage medium, or propagated signal capable of providing instructions to the client 110 device. In particular, the applications may be stored on a storage medium or device (e.g., a read only memory (ROM), a random access memory (RAM), a volatile/non-volatile memory, a magnetic disk, or a propagated signal) readable by the client device 110, such that if the storage medium or device is read by the client device 110, the specified step or instructions are performed.

The client device 110 also may include one or more communications interfaces that allow the client device to send and receive information using the communications paths 140.

The communications paths 140 may be configured to send and receive signals (e.g., electrical, electromagnetic, or optical) that convey or carry data streams representing various types of analog and/or digital content. For example, the communications paths 140 may be implemented using various communications media and one or more networks comprising one or more network devices (e.g., servers, routers, switches, hubs, repeaters, and storage devices). The one or more networks may include a WAN, a LAN, a plain old telephone service (POTS) network, a digital subscriber line (DSL) network, an integrated services digital network (ISDN), and a synchronous optical network (SONET), or a combination of two or more of these networks. In addition, the communications paths 140 may include one or more wireless links that transmit and receive electromagnetic signals, such as, for example, radio, infrared, and microwave signals to convey information.

The communications system 100 uses a publish-subscribe paradigm or technique to exchange data between the client devices 110. According to this technique, each client device 110 may be an information consumer or producer. As an information producer, the client device 110 may publish information to the CBM network 120. As an information consumer, the client device 110 registers a subscription to specific information published to the CBM network 120. The CBM network 120 provides notifications of the published information (e.g., as messages) to those consumer client devices 110 that have registered subscriptions to the information.

In some implementations, the CBM network 120 may be implemented using a publish-subscribe system, such as, for example, Elvin, CosNotif, JMS, Keryx, and Gryphon to distribute information to the client devices 110 and their associated communications applications. In one implementation of the communications system 100, the Elvin CBM infrastructure is used.

In some implementations, CBM network 120 may include one or more data processing and distribution devices (e.g., a server, a router, and associated communications media and data transport systems). For example, CBM network 120 may include one or more CBM routers 125 and communications interfaces (not shown) that receive the published information and generate messages that are transmitted to the consumers who subscribe to the information.

CBM router 125 may be implemented by a processor and a CBM routing application that exchanges information with the communications interfaces (which are configured to communicate with the communications paths 140).

Other implementations are within the scope of the following claims.

What is claimed is:

1. A publish-subscribe system comprising:
   a producer configured to publish a message and to subscribe to an acknowledgement that the message was received;
   a consumer configured to subscribe to the message and to publish the acknowledgement; and
   a network configured to register a message subscription and an acknowledgement subscription, to process the message subscription and the acknowledgement subscription, to forward the message to the consumer based on the message subscription and to forward the acknowledgement to the producer based on the acknowledgement subscription;
   wherein the message subscription corresponds to a type of message content of interest to the consumer, and the acknowledgement subscription corresponds to a type of acknowledgement content of interest to the producer.

2. The system of claim 1 wherein the producer includes a reliability mechanism to subscribe to the acknowledgement associated with a published message.

3. The system of claim 1 wherein the producer includes a timer and the producer republishes the message if a period of time expires before receiving the acknowledgement.

4. The system of claim 1 wherein the consumer includes a reliability mechanism to publish the acknowledgement.

5. The system of claim 4, wherein the reliability mechanism removes duplicate messages.

6. The system of claim 1, wherein the network includes a content-based messaging (CBM) router to route the message and the acknowledgement.

7. The system of claim 1, further comprising a reliability mechanism that uses a generic addressing scheme in identifying client devices.

8. The system of claim 7, wherein the generic addressing scheme provides a unique identity to the consumer and the producer.

9. An application program interface (API) for content-based messaging comprising a computer readable storage medium for storing instructions that are executable by a processor to:
   receive a message from a producer application according to a message subscription;
   register an acknowledgement subscription for an acknowledgement to the message;
   modify the message by adding at least one field to the message;
   forward the message to an interface to publish the message to a content-based message (CBM) network; and
   receive the acknowledgement from the interface according to the acknowledgement subscription;
   wherein the message subscription corresponds to a type of message content of interest to the consumer, and the acknowledgement subscription corresponds to a type of acknowledgement content of interest to the producer.

10. The API of claim 9 wherein the API includes instructions to cause a processor to implement a timer and republish the message if a period of time expires before receiving the acknowledgement.

11. The API of claim 9 wherein the at least one field includes an identification field and a message type field.

12. The API of claim 9 wherein the at least one field includes a recipient field that identifies one or more receivers of the message.

13. The API of claim 10 wherein the at least one field includes a sender field that identifies a sender of the message.

14. An application program interface (API) for content-based messaging comprising a computer readable storage medium for storing instructions that are executable by a processor to:
   receive a message from an interface according to a message subscription;
   modify the message by removing at least one field from the message;
   publish an acknowledgement to the message; and
   forward the message to a consumer application according to an acknowledgement subscription;
   wherein the message subscription corresponds to a type of message content of interest to the consumer, and the acknowledgement subscription corresponds to a type of acknowledgement content of interest to the producer.

15. The API of claim 14, wherein the API includes instructions to cause a processor to determine if the message has been previously received and to filter out the message if the message has previously been sent.

16. The API of claim 14, wherein the at least one field includes an identification field and a message type field.

17. The API of claim 14, wherein the at least one field includes a recipient field that identifies one or more receivers of the message.

18. The API of claim 14, wherein the at least one field includes a sender field that identifies a sender of the message.

* * * * *